United States Patent [19]

Pool

[11] 3,795,314

[45] Mar. 5, 1974

[54] WATER TREATMENT MUD DECANTING TANK

[76] Inventor: Julio Von Thaden Pool, Baja California No. 245-201, Mexico City, Mexico

[22] Filed: Sept. 20, 1972

[21] Appl. No.: 290,688

[52] U.S. Cl............................... 210/208, 210/219
[51] Int. Cl............................................ B01d 21/14
[58] Field of Search ....... 210/60, 62, 197, 208, 219, 210/319, 523

[56] References Cited
UNITED STATES PATENTS

| | | | |
|---|---|---|---|
| 3,397,788 | 8/1968 | Duff et al. | 210/197 X |
| 2,429,315 | 10/1947 | Green | 210/208 |
| 2,348,122 | 5/1944 | Green | 210/208 X |
| 2,314,977 | 3/1943 | Green | 210/208 X |

Primary Examiner—John Adee
Assistant Examiner—Robert H. Spitzer
Attorney, Agent, or Firm—Ladas, Parry, Von Gehr, Goldsmith & Deschamps

[57] ABSTRACT

A mud decanting tank for water cold treatment with lime including a substantially cylindrical tank, housing a concentric pipe opened at its ends, and a second vertical eccentric pipe engaged at its top portion with said first pipe by a channel; and at its lower end said eccentric pipe being engaged with a third horizontal pipe located slightly spaced below the open lower end of the first mentioned vertical pipe; the third horizontal pipe including at its lower portion a bore; said three pipes forming a continuous recycling pipeline which draw out the muds by suction from the bottom of said tank by means of stirrers and removers mounted in a pair of parallelly spaced shafts housed respectively in each one of said vertical pipes, said shafts being driven in the same direction by a prime mover.

8 Claims, 3 Drawing Figures

WATER TREATMENT MUD DECANTING TANK

BACKGROUND OF THE INVENTION

The remarkable industrial development has increased the need for soft or treated water which is used in boilers, industrial plants and the like.

The water, in its natural condition, takes up oxygen, carbon dioxide, nitrogen, dust and other impurities from air. Said elements render the water more or less solvent for earth minerals. This contamination may be subsequently increased by acids resulting from falling organic matter, industrial waste and sewage. The materials contained in the water can be classified as dissolved or suspended. In the term dissolved substances, are included calcium bicarbonate, as well as magnesium and sodium bicarbonate, that is: Ca $(HCO_3)_2$, Mg $(HCO_3)$ and Na $HCO_3$; calcium, magnesium and sodium sulphates. Ca $SO_4$, Mg $SO_4$, $Na_2$ $SO_4$; calcium and magnesium nitrates Ca $(NO_3)_2$ and Mg $(NO_3)_2$; calcium, magnesium and sodium chorides $CaCl_2$, Mg $Cl_2$ and NaCl, iron oxide $Fe_2O_3$; silicon dioxide $SiO_2$; industrial wastes and gases such as oxygen $O_2$ and carbon dioxide $CO_2$.

The suspended materials comprise mud, sand, material of vegetal origon and industrial waste.

The water impurities produce in boilers and power plants damaging effects such as reduction of the amount of heat transfer due to scaling on the water heating surfaces; corroding of the steel of boilers thus making it brittle; cost increases for cleaning, repairing, inspection, maintenance and preservation of the equipment; heat losses due to the need of frequent water purges; and enconomy losses in steam equipment caused by the dirty steam.

The term "water hardness" is used to indicate the tendency of water to form scales and crusts that will depend on the nature of the impurities carried by the water. This water hardness can be rated as hardness with cabonates or hardness without carbonates. The amount of the scale forming materials can be expressed in terms of ppm equivalent to calcium carbonate ($CaCO_3$). The hard waters vary in a hardness range from less than 10 ppm to more than 1800 ppm. Such high hardness in the water makes it unsuitable for industrial purposes.

The water treatment for removing or reducing impurities must be carried out only after a suitable analysis of the water to be treated has been effected. There is no suitable process or treatment for all types of water, each case must be considered individually. Among the processes employed for water treatment, mention may be made of the following: waste removal by means of moving or stationary screens; filtering; the separation of mud and residues in settling reservoirs; heating; evaporation or distillation by aeration; treatment with lime; treatment with sodium carbonate; treatment with a combination of lime and sodium carbonate, with lime and barium, with trisodium phosphate, with coagulants and with zeolite softeners. The diversified processes are not carried out in the same manner, some of them are continuous and others are of the batch type.

SUMMARY OF THE INVENTION

The process of the present invention is the one related to the water treatment, called a cold treatment with lime.

This process is suitable for the water hardness with carbonates, wherein the lime used is in its hydrated form, Ca $(OH)_2$. The alkalinity is lowered and the carbonic acid in the water, $CO_2$ is eliminated, whether in its free state or in combination with bicarbonate, and relatively insoluble precipitates of calcium carbonate and magnesium hydroxide are formed. The respective reactions are:

$$CO_2 + Ca(OH)_2 \rightarrow CaCO_3 + H_2O$$

$$Ca(HCO_3)_2 + Ca(OH)_2 \rightarrow 2CaCO_3 + 2H_2O$$

$$Mg(HCO_3)_2 + 2Ca(OH)_2 \rightarrow Mg(OH)_2 + 2CaCO_3 + 2H_2O$$

$$2NaHCO_3 + Ca(OH)_2 \rightarrow CaCO_3 + Na_2CO_3 + 2H_2O$$

The process is carried out in a most suitable manner in large tanks wherein the soft water can be decanted and the muds can be removed from the processing plant.

Heretofore the tanks used to carry out this type of process have employed means that prevent a complete reaction of the chemicals and wherein the proportioning or metering of the reagents cannot be adjusted or controlled at a fast rate and the homogeneity of the mixture is not optimum.

The equipment used heretofore is characterized in that it includes a substantially cylindrical tank, inside of which and concentrically to same is located a second cylinder in the vertical axis of which, in turn, is located a shaft that drives a stirrer to recycle the muds and the chemicals which, due to a tapered cone formed at the bottom of the tank, shall be deposited, depending on their density, in successive layers leaving the soft or processed water on top, from which it is removed for later use.

It is an object of the present invention to provide a mud decanting tank including a recycling of the muds and chemicals promoting a more complete reaction of same and affording the proper proportioning of the reagents, thereby obtaining an homogeneous mixture.

Said mud decanting tank for the water cold treatment with lime of the present invention comprises a substantially cylindrical tank having an interiorly tapered bottom, and a concentric pipe housing a central vertical shaft driving a stirrer and a coaxial remover driven by means of a suitable prime mover and comprising manifolds or overflows located at a determined level for drawing out the processed water and a reservoir for chemicals supplying and metering. There is also included therein a second eccentric inner pipe having also a central vertical shaft that drives a stirrer and remover by means of a suitable prime mover engaged or coupled to the top of the central pipe. Said eccentric pipe, at its lower end, leads to a third horizontal pipe located slightly below the lower outlet of the first concentric pipe; the horizontal pipe being closed at its ends and including a mouth or bore in a lower side portion, concentric to the tank.

The distribution of said inner piping provides, by means of the stirrers, a continuous recycling of the muds and chemicals, thereby attaining the beneficial effects above mentioned.

These and other objects that are realized by the practice of this invention will be better understood upon reading the following description in which reference is made to the enclosed drawing and of the preferred embodiment of the same.

DETAILED DESCRIPTION OF THE DRAWINGS

DETAILED DESCRIPTION OF THE INVENTION

Figure 1:
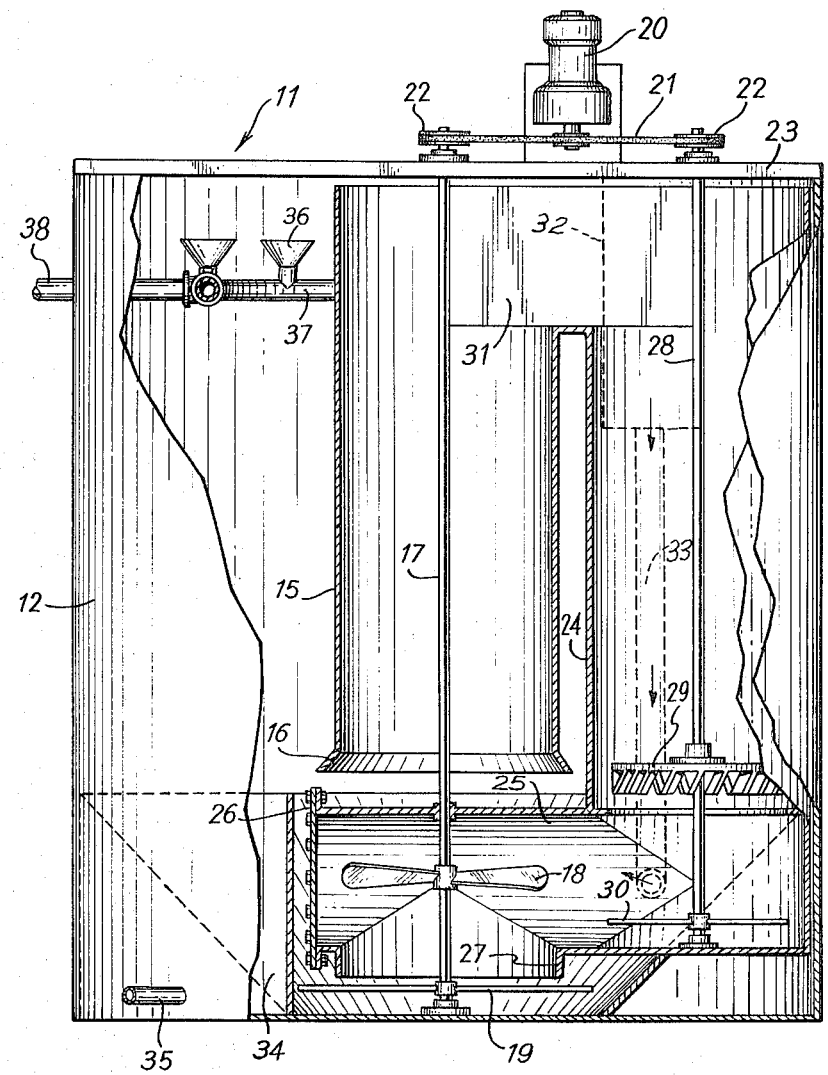
FIG. 1, is a side elevational view with a partial section, showing the decanting tank of the present invention.
Figure 2:
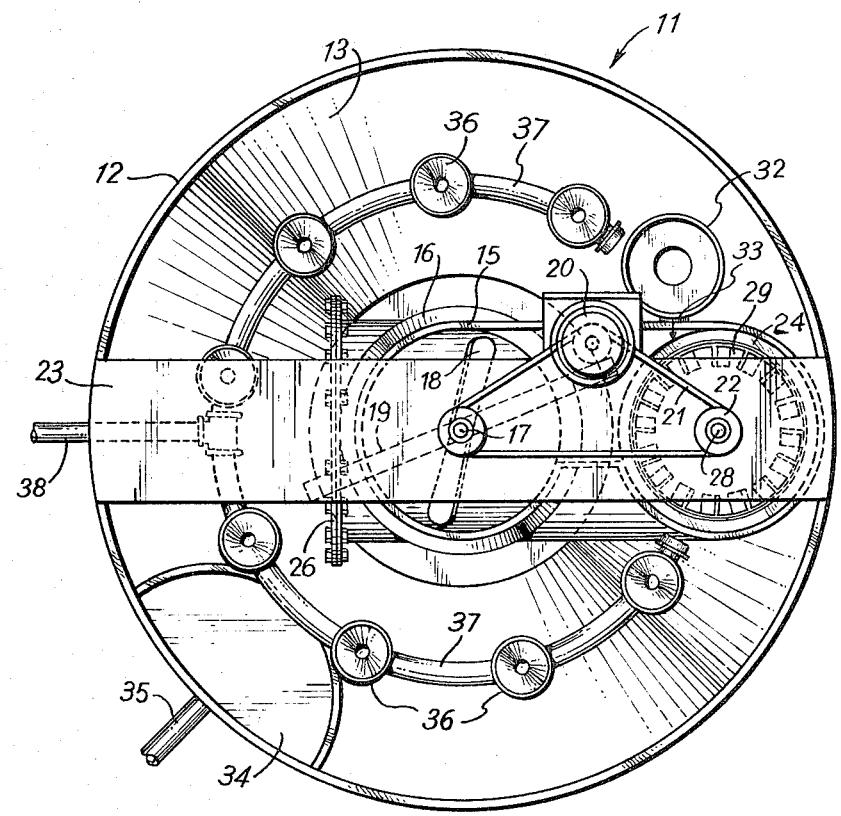
FIG. 2, is a top plan view of the decanting tank of the present invention.
Figure 3:
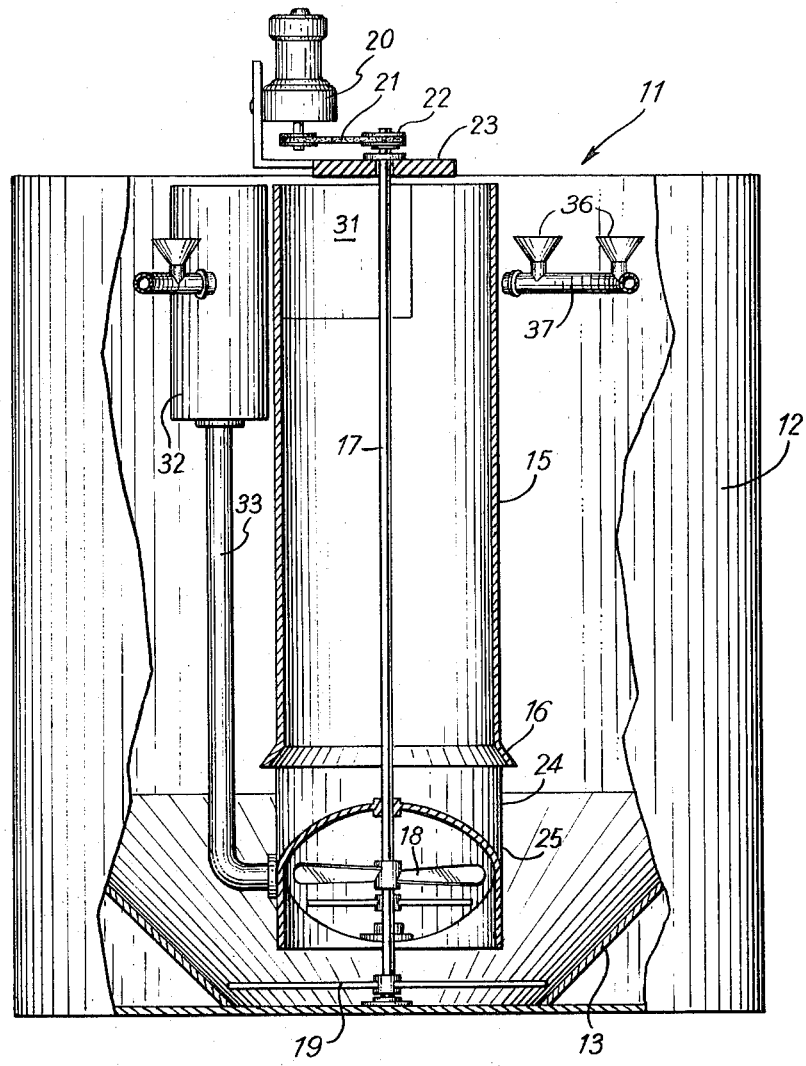
FIG. 3, is a side elevational view with a partial section, at 90° from the view shown in FIG. 1.

The mud decanting tank 11, for water cold treatment with lime of the present invention includes a cylindrical tank 12, substantially vertical with its inner bottom 13, being tapered to promote decantation of the impurities, and includes an upright concentric pipe 15, having a slightly flared mouth or outlet 16, that houses a concentric vertical shaft 17, that drives a stirrer 18, and a bar remover 19, by means of a suitable prime mover, such as a reducing motor 20, through bands 21 and pulleys 22, supported on top of said tank, at a structure 23 and including a second eccentric vertical pipe 24, with its side wall substantially tangent to the tank wall.

The eccentric pipe is engaged at its lower end to a third horizontal pipe 25, having its end closed by a plate 26 and the top of which is slightly spaced below the outlet 16 of pipe 15. The horizontal pipe 25 includes at the lower portion of its side wall a mouth 27 from which the muds are drawn out by suction from the bottom of said tank.

At the top, both vertical pipes are joined by means of a channel 31.

The muds are drawn out by suction from the bottom of the tank through mouth 27 by means of stirrer 18 located in the horizontal pipe 25 from which, by means of the turbine stirrer 29, said muds are cycled through the vertical pipe 24, passing through the channel 31 and down the concentric pipe 15 to the bottom of the tank, wherein the recycling is once more initiated so that, as previously noted, a promotion of a more complete reaction of the muds and chemicals is effected and thus affording a better control and metering of the reagents that are fed to tank 32 and by means of a conduit 33 are introduced into the lower end of pipe 24, to be mixed with the muds.

In order to avoid unwanted buildup of the muds, the bar removers 19 and 30 are respectively included in the lower part of shafts 17 and 28.

The tank 12 includes at its lower end a compartment 34 formed by a cylindrical wall intersecting the tank wall 12 and having an outer purging conduit 35 for draining the settled material.

At a certain level, manifolds or overflows 36 are included in order to withdraw the processed and clarified water from the tank through piping 37 that communicates with the outlet pipe 38.

Even though, the above description has been made in relation to a specific embodiment of the invention, it is to be understood by those skilled in the art that the above mentioned or any other change in form and detail, should be considered as being comprised within the true spirit and scope of same.

I claim:

1. A mud decanting tank for water cold treatment with lime including a substantially cylindrical tank with an inner tapered bottom and an inner concentric pipe open at its upper and lower ends and disposed substantially vertical housing a central vertical shaft that drives a coaxial stirrer and bar remover by means of a suitable prime mover, overflow means for the processed water, a reservoir for metering reagents and a draining means for settled solids, wherein said tank having a second eccentric inner pipe closed at its lower end including a central vertical shaft that drives a second stirrer and bar remover by means of a suitable prime mover, said second pipe being in communication with the top of the concentric pipe by means of a channel, said eccentric pipe being also communicated at its lower side wall to a third horizontal pipe located slightly spaced below the open lower end of the vertical concentric pipe, said horizontal pipe being closed at its end and including a bore leading downwardly concentric with the tank at a lower side portion of the pipe for drawing out the mud by suction, and wherein said stirrer of said central shaft is located in said horizontal pipe above said mud suction bore and said first and second bar removers are located at the lower end of their respective shafts.

2. A mud decanting tank according to claim 1, wherein the stirrers are of the turbine type.

3. A mud decanting tank according to claim 1, wherein said open lower end of said inner concentric pipe located slightly above said third horizontal pipe is flared.

4. A mud decanting tank according to claim 1, wherein said shafts are driven in the same direction by a reducing motor located on top of the tank by means of bands and pulleys.

5. A mud decanting tank according to claim 1, wherein the eccentric pipe has its side wall substantially tangent to the tank wall.

6. A mud decanting tank according to claim 1, wherein the cross section of said concentric and eccentric pipes is substantially circular.

7. A mud decanting tank according to claim 1, wherein the reagent reservoir includes a conduit communicating same with the horizontal pipe.

8. A mud decanting tank according to claim 1, wherein the channel joining both concentric and eccentric pipes has its side walls tangent to the walls of the pipes.

* * * * *